TRANSDUCER CIRCUITS WITH FREQUENCY AMPLITUDE CONTROL

Original Filed Oct. 22, 1959

INVENTOR
Norman J. Anderson
BY Morgan, Finnegan, Durham & Pine
ATTORNEYS

INVENTOR
Norman J. Anderson
BY Morgan, Finnegan, Durham & Pine
ATTORNEYS

United States Patent Office 3,437,920
Patented Apr. 8, 1969

3,437,920

TRANSDUCER CIRCUITS WITH FREQUENCY-AMPLITUDE CONTROL

Norman J. Anderson, 152 Fairview Ave.,
Boonton, N.J. 07005

Continuation of application Ser. No. 848,041, Oct. 22, 1959. This application Sept. 14, 1965, Ser. No. 495,004
Int. Cl. G01r 27/16, 17/06
U.S. Cl. 324—57 14 Claims

ABSTRACT OF THE DISCLOSURE

A translating system for converting a variable quantity into a related electrical signal including an energizing source coupled across an oscillatory network having a reactance element connected in parallel with a pair of series-connected reactance elements, one of which is variable and responsive to said variable quantity, and automatic amplitude control means for maintaining the amplitude of the voltage appearing across said network constant, whereby said electrical signal appearing across said variable reactance is linearly related to said variable reactance.

This application is a continuation of my copending application Ser. No. 848,041, filed Oct. 22, 1965, now abandoned.

Apparatus for translating certain physical quantities into related electrical quantities are well known and widely used. One class of these transducers embraces the translation of physical displacement into equivalent electric signals. Ultimately, the physical displacement is the result of an initial force manifested, for example, by pressure, heat, or acceleration. The result electrical signal serves in this event as a measure of the initiating quantity. In other cases the physical displacement is initiated by data represented geometrically, as by the configuration of a cam, record groove or the like.

Almost all electrical components may function as transducers since their values can be varied in response to some displacement. Thus a potentiometer, inductor or capacitor may be varied by physically displacing some element thereof— the potentiometer arm, the core of the inductor or a plate of the capacitor. Each may be physically displaced to change the value of the component. By energizing the component and connecting it in some appropriate circuit, its variation can be made to affect some electrical parameter such as the amplitude of a voltage or current or the value of a frequency or a phase relationship.

This invention is within the class described above since physical displacement is made to vary an electrical component, as for example an inductive or capacitive element. It is distinguishable from the other members of its class the mode of effecting translation involves chemical, piezo-electric, thermo-electric or photo-electric transformations. It is distinguishable from the other members of its class in its novel circuitry by which the variable elements are excited and by which the variation is sensed. It is also distinguishable in its performance, reflected in heretofore unattaintable linearity, in simplicity and compactness, in negligible loading and power requirements, by its freedom from corrupting signals and noise and by its capacity for multiple transduction.

While many circuit make proper claim to being transducers few qualify as truly linear devices, i.e., arrangements in which the output of the arrangement is linearly related to the input. Some transducers are linear over an insignificant range, others may be made to provide wide range linearity provided continuous adjustment or extraordinarily complicated and expensive circuits are employed. These latter steps are rendered necessary in the classical arrangements by virtue of the inherent non-linearity in most electrical components, the ever present inter-dependence among electrical circuit elements, and, the load, frequency, and power supply limitations which always burden practical circuit embodiments.

In marked contrast to prior art endeavors, the invention provides, in a simple arrange. of simple elements, a single or multiple data transducer having a wide range of linearity, excellent sensitivity and stability, and completely automatic and reliable performance.

Besides serving as transducers, the circuits embodying the concepts of the invention are also useful in the measurement of electrical component parameters such as inductance and capacitance.

It is thus an object of this invention to provide a transducer which is linear over a wide range of input variations.

It is a further object of this invention to provide a transducer which is self-contained and simple in configuration.

Another object of this invention is to provide a transducer which is continuously and automatically operative and which requires no manual monitoring or operative adjustments.

A further object of the invention is to provide a transducer which introduces a minimum load to the data source.

A still further object of the invention is to provide a linear transducer directly and linearly responsive to a plurality of separate sets of data or separate aspects of the same data.

A still further object of the invention is to provide a circuit which is also useful in measuring electrical component parameters.

These and other objects and advantages of the invention will be set forth in part hereinafter and in part will be obvious herefrom, or may be learned by practice with the invention, the same being realized and attained by means of the instrumentalities and combinations pointed out in the appended claims.

It will be understood that the foregoing general description and the following detailed description as well are exemplary and explanatory of the invention but are not restrictive thereof.

To illustrate the principles of the invention and exemplary embodiments thereof, reference may be had to the drawings wherein.

Figure 1:
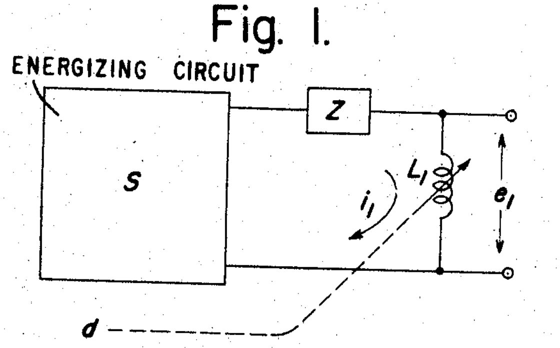
FIG. 1 is a simplified schematic illustration of certain network arrangements of the invention involving an inductive pick-up element.

In FIGURE 1 a simple series loop comprising circuit S, impedance Z and inductor $L_1$ is disclosed. A current, $i_1$, flows in the loop, being supplied from circuit S. In flowing through inductor $L_1$ current $i_1$ produces a voltage $e_1$, dropped across the inductor. It is assumed in this arrangement that the resistive component of $L_1$ is negligible in effect.

Symbolizing the actuation of the circuit is the connection from the input $d$ to the variable inductor $L_1$ which responds to changes in the magnitude of $d$. The input $d$ may be considered a displacement initiated by any quantity. The displacement may result from a force associated with pressure, temperature, acceleration or the like or from a cam track, record groove or other geometrically represented quantity. The inductor $L_1$ may be made variable in any one of many known ways, for example, by varying the position or magnetization of a core element or the position of an eddy current ring relative to the inductor winding.

An analysis of the circuit of FIGURE 1 indicates that the voltage drop, $e_1$, across inductor $L_1$ is determined by the relationship $$e_1 = jwL_1i_1 \quad (1)$$

Expression (1) indicates that, for $e_1$ to be linearly related to $L_1$, the factor, $wi_1$, must be constant. If this condition prevails and if $L_1$ is a linear function of the input $d$, then the output voltage $e_1$ will also be a linear function of $d$. This result pre-supposes, of course, that the arrangement, not shown, which responds to voltage $e_1$, does not adversely load the circuit.

Since a linear response is dependent upon the constancy of the factor, $wi_1$, it is pertinent to determine whether or not this factor is constant. It will be found in general that the current, $i_1$, is not constant in the presence of changes in inductance $L_1$. On the other hand, the radian frequency, $w$, may or may not be constant, depending upon the nature of the source selected to energize the loop. It will also be found that in general the product of the two, $wi_1$, will not be constant in the presence of changes in inductance $L_1$ and this is particularly true if circuit S consists of the usual sources, whether idealized or Thevenin.

In view of the variable nature of factor $wi_1$ with conventional energizing arrangements, it is clear that circuit S must comprise a special arrangement of components which maintains $wi_1$ constant notwithstanding changes in the value of inductance $L_1$. Such a circuit will be described hereinafter.

Figure 2:
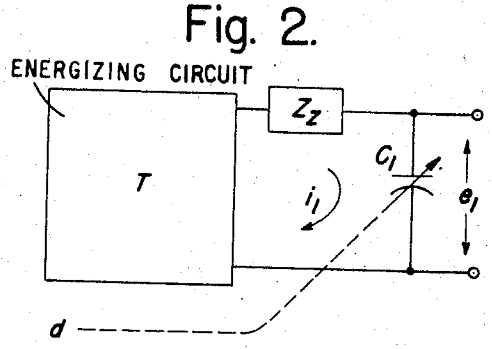
FIG. 2 is an analogous circuit arrangement with a capacitive pick-up element.

In FIGURE 2 another arrangement is illustrated comprising the circuit T which supplies the series arrangement of impedance $Z_2$ and capacitance $C_1$ with a current $i_1$. In analogous fashion to the arrangement of FIGURE 1, capacitor $C_1$ is the variable element which senses the input $d$. The output voltage, $e_1$ represents the voltage drop occurring across the capacitance $C_1$ as a result of the current, $i_1$. In this circuit, the main inquiry again is concerned with the relationship between $C_1$ and the voltage, $e_1$, responsive thereto. This voltage, which is described by the expression:

$$e_1 = -ji_1/wC_1 \quad (2)$$

will be a linear function of the elastance $1/C_1$, provided the factor $i_1/w$ is a constant. It may be shown that this factor is generally not constant and this is particularly so when the loop is energized by a conventional or idealized source. Thus, as will be described hereinafter, the circuit T of FIGURE 2 comprises a special arrangement of elements which does maintain the factor, $i_1/w$ constant, thereby insuring a linear response of voltage $e_1$ to elastance $1/C_1$. By making the elastance a linear function of the input variable $d$, a completely linear transfer function for the entire arrangement is attained. The linear variation of elastance with respect to the input $d$, presents straightforward design considerations which can involve any one of many known techniques such as the variation of $C_1$ by varying the distance between the plates of the capacitor or by varying the degree of overlap of the plates, specially shaped.

Figure 3:
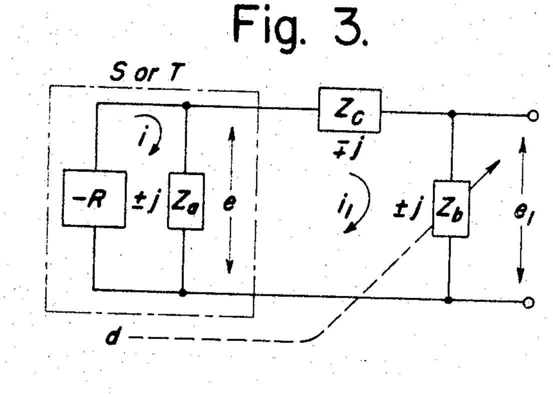
FIG. 3 is a circuit arrangement illustrating details of the circuit S and T of FIGS. 1 and 2.

Reference may now be had to FIG. 3 which generalizes the circuits of FIGURES 1 and 2 and which discloses schematically an arrangement of elements for providing the desired characteristics in the circuits S and T of those figures.

The arrangement of FIGURE 3 comprises series-connected impedances $Z_b$ and $Z_c$ energized with a current $i_1$ from a circuit which consists of a network $-R$ shunted by an impedance $Z_a$. The energizing circuit corresponds with the circuits S or T of FIGURES 1 and 2; the series impedances $Z_c$, $Z_b$ correspond with Z and $L_1$ in FIGURE 1 and $Z_2$ and $C_1$ in FIGURE 2. As in the prior circuits, a current $i_1$ flows in the output branch causes a voltage drop $e_1$ to appear across the impedance $Z_b$. This impedance is made variable in accordance with the value of the input, $d$. Each impedance disclosed in the circuit is assigned one of two alternate conjugates corresponding with inductance $(+j)$ and capacitance $(-j)$. If $Z_a$ is given a $(+j)$ characteristic, i.e., it has an effectively inductive character, then $Z_b$ will have a similar $(+j)$ characteristics. Alternatively, if $Z_a$ has a capacitive effect $(-j)$ then $Z_b$ will also have a capacitive effect $(-j)$. $Z_c$ is assigned a reactive character which is the conjugate of $Z_a$ and $Z_b$ in order to obtain effects which improve the performance of the circuits in specific applications.

Two currents, $i$ and $i_1$, flow in the two loops of FIGURE 3 and it will be initially assumed that current $i_1$ is substantially greater than current $i$. Under these conditions, and assuming $Z_a$ is substantially an inductance, L, the voltage $e$ may be characterized as $$e = jwLi_1 \quad (3)$$

It is evident from this expression that if the voltage $e$ and inductance L are each held constant, then the factor $wi_1$ will be a constant. If these conditions are met, and $Z_b$ is inductive, then a linear response of output voltage $e_1$ to input $Z_b$ will obtain.

If the impedance $Z_a$ is substantially a capacitance, C, then the expression for voltage $e$ becomes $$e = -ji_1/wC \quad (4)$$

This expression reveals that if voltage $e$ and elastance $1/C$ are maintained constant then the factor $i_1/w$ will remain constant. Since $Z_b$ is to be capacitive in these circumstances, the output $e_1$ will be linearly related to it.

The voltage $e$ is supplied from the circuit $-R$, the function of which is to maintain $e$ at a constant magnitude and at a frequency which corresponds with the resonant frequency of the circuit $Z_a$, $Z_b$, $Z_c$. This circuit is capable of resonating since $Z_c$ is always of opposite sign to $Z_a$ and $Z_b$. Since $Z_b$ is variable this resonant frequency must change as $Z_b$ changes. The arrangement of components in the circuit, $-R$, for insuring these conditions will be described hereinafter.

In summary, $e_1$, may be made to vary linearly with respect to $Z_b$, i.e., to the inductive or elastive sensing elements ($L_1$ or $1/C_1$) provided that $Z_a$ has the same reactive sign as $Z_b$, the applied voltage $e$ is maintained at a substantially constant amplitude and has a frequency corresponding with the resonant frequency of the circuit.

Figure 4:
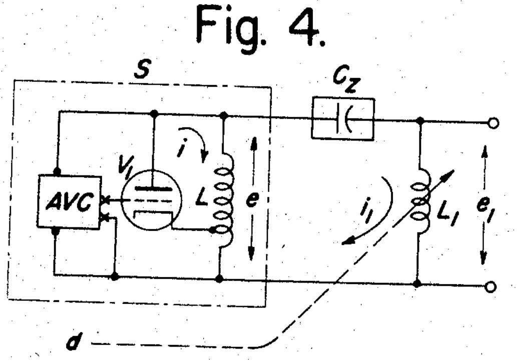
FIGS. 4 and 6 are alternate circuit arrangements related to FIGS. 1 and 3.

Illustrating schematically the means for obtaining the above conditions is the circuit of FIGURE 4 which employs an inductive sensing or pick-up element $L_1$. Serially connected to $L_1$ is capacitance $C_z$, the resultant network being supplied with a current $i_1$ originating in circuit S. The input, $d$, to the circuit causes a change in $L_1$ and a resultant change in $e_1$, this voltage occurring across $L_1$ as a result of current $i_1$.

The relation of FIGURE 4 to FIGURE 3 is seen in the fact that the inductance L is the counterpart of $Z_a$ while $C_z$ and $L_1$ corresponds to $Z_c$ and $Z_b$. As in FIGURE 3, a voltage $e$ is impressed across the output network L, $C_z$, $L_1$, and the network yields, across $L_1$, a voltage $e_1$ responsive to $d$. Because there are reactances of opposite sign, the circuit has a resonant (actually anti-resonant) frequency, and the frequency of the energizing voltage $e$ will correspond with this resonant frequency because the circuit is oscillatory. There is accordingly an amplifier $V_1$ and a feedback circuit associated therewith for providing the necessary negative resistance characteristic. Only the significant AC circuit of the amplifier is shown, the plate and filament supplies being omitted for simplicity.

The plate of $V_1$ is connected to one side of inductor L while the cathode is connected to a tap on L. Regenerative feedback is obtained by connecting the grid, via the output terminals of an AVC circuit, to the lower terminal of L.

Since the circuit of FIGURE 4 is oscillatory, and since the frequency of oscillation is determined by the reactive elements L, $C_z$ and $L_1$, then a resonant condition is maintained in the network of reactive elements even in the presence of changes in $L_1$.

The added condition of providing a constant-amplitude energizing voltage, *e*, is achieved by controlling the oscillator with an AVC circuit. To this end, the AVC circuit receives as an input, and monitors, the voltage *e*; it acts to prevent changes in the amplitude thereof by supplying an appropriate signal to the grid. The signal combines with the feedback voltage obtained from L to provide a net driving voltage for the oscillator. The details of a suitable AVC circuit are available to the art. One particular circuit is disclosed in applicant's copending application, Ser. No. 712,423, filed January 31, 1958 entitled "Apparatus and Method for Achieving Symmetrical Response and Simple Time Characteristics," now Patent No, 3,137,822.

An additional feature, discussed in connection with FIGURE 3 and also found in all the circuits, is the high Q condition. The circuits disclosed are inherently capable of having this characteristic which is obatined by well known techniques relating to proper selection of component values and the choice of operating frequencies.

With the above conditions satisfied, the circuit of FIGURE 4 provides, as demonstrated in connection with FIGURE 3, a linear response of $e_1$ to $L_1$. Such a response also characterizes the circuit of FIGURE 5.

Figure 5:
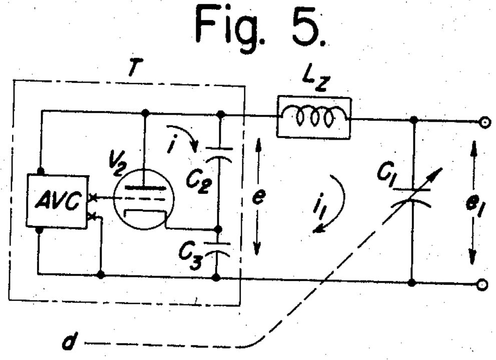
FIGS. 5 and 7 are alternate circuit arrangements related to FIGS. 2 and 3.

FIGURE 5 is analogous to FIGURE 4 having the same topological arrangement. In this figure, capacitances, have been replaced by inductances and vice versa. The circuit oscillates, has a high Q characteristic and includes a substantially constant voltage, *e*, the frequency of which automatically tracks changes in $C_1$ resulting from change in the input, *d*. Accordingly, a resonant condition is maintained. The constant voltage feature is promoted by an AVC circuit similar to the one employed in FIGURE 4.

In comparing FIGURES 4 and 5 it may be observed that the former is adaptable to use where an inductive pick-up is desired while the latter is appropriate for capacitive pick-ups.

Figure 6:
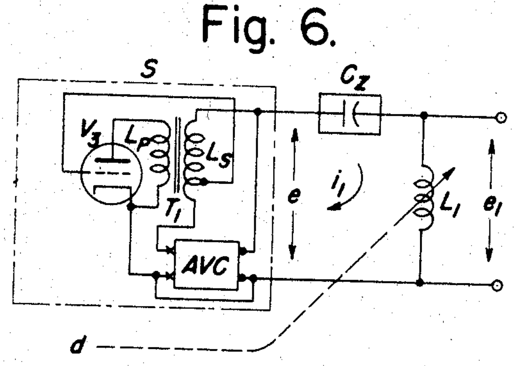

FIGURE 6 is comparable to its predecessors described above and is designed to be used where conditions suggest an inductive pick-up. While the conditions prerequisite to linearity exist in this circuit too, they are obtained by a topologically different arrangement resulting from the use of transformer $T_1$.

The primary $L_p$ of transformer $T_1$ is connected to the plate and cathode of $V_3$ respectively for coupling energy into the tuned output network which comprises the secondary $L_s$, capacitor $C_z$ and inductance $L_1$. Secondary $L_s$ is effectively coupled to $L_1$ because there is a low RF impedance across the output terminals of the AVC circuit. Moreover, and this is true with respect to the AVC circuits of FIGURES 4 and 5, the AVC input impedance is high so that a negligible amount of current $i_1$ is diverted through this circuit and negligible loading exists.

The feedback path which cooperates with $V_3$ to establish an oscillatory condition includes the coupling of a portion of the secondary voltage, obtained from a tap on $L_s$, back to the grid of $V_3$.

As with the prior circuits, the embodiment of FIGURE 6, in addition to resonating, develops a substantially constant voltage *e* and has a high Q. Accordingly, the output voltage $e_1$ is linearly related to the pick-up $L_1$ across which this voltage is developed. If the input *d* which actuates $L_1$ is linearly related thereto then the entire transfer function may be provided with a linear characteristic.

It has been found in connection with FIGURE 6 that the use of a transformer provides a number of advantages relating to performance of the oscillator and requirements of the AVC system. In addition, the common character of branch $Z_a$ (L in FIGURE 4, $C_2$–$C_3$ in FIGURE 5) is eliminated. While this appears to eliminate the need for making the current $i_1$ large compared to current *i*, it will nevertheless be found that the conditions of resonance, high Q and constant voltage *e* are desirable to insure linear performance.

Figure 7:
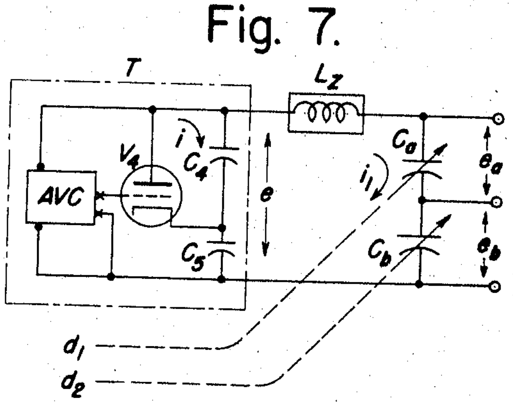

It has been noted hereinbefore in connection with all of the figures that the output voltage $e_1$ is dependent upon the factors $L_1$ or $1/C_1$, *w* and *i*. The means have been shown for holding the relationships *wi* or *i/w* constant. When these conditions prevail the output voltage depends solely upon the variable reactance across which the voltage is developed. Accordingly, the output voltage is independent of other circuit elements serially associated with the pick-up. Moreover, the automatic resonance feature maintains the circuit in resonance even if these circuit elements change value. Thus, the invention in addition to providing immunity to corrupting effects, may be exploited to provide multiple transduction. This is so because one transducer element may be varied without disturbing the outputs associated with other transducer elements located in the same circuit. This feature is illustrated in FIGURE 7 where inputs $d_1$ and $d_2$, which may be independent or related data sources, actuate a pair of series-arranged capacitors $C_a$ and $C_b$. While only two inputs are shown, it should of course be understood that any number may be handled by the circuit. This multiple data-sensing technique is also equally applicable to the circuits of FIGURES 4, 5 and 6.

FIGURE 7 is similar to FIGURE 5 except that capacitive pick-up $C_1$ has been replaced by the two serially-connected pick-ups $C_a$ and $C_b$. These inputs, as noted above, may be totally unrelated or may be dependent on and related to some primary quantity. In either event independent outputs $e_a$ and $e_b$ are obtained across $C_a$ and $C_b$. Each of these voltages depends on its associated capacitor and is not influenced by the actions of the other pick-up. Thus problems such as cross-talk are eliminated.

Figure 8:
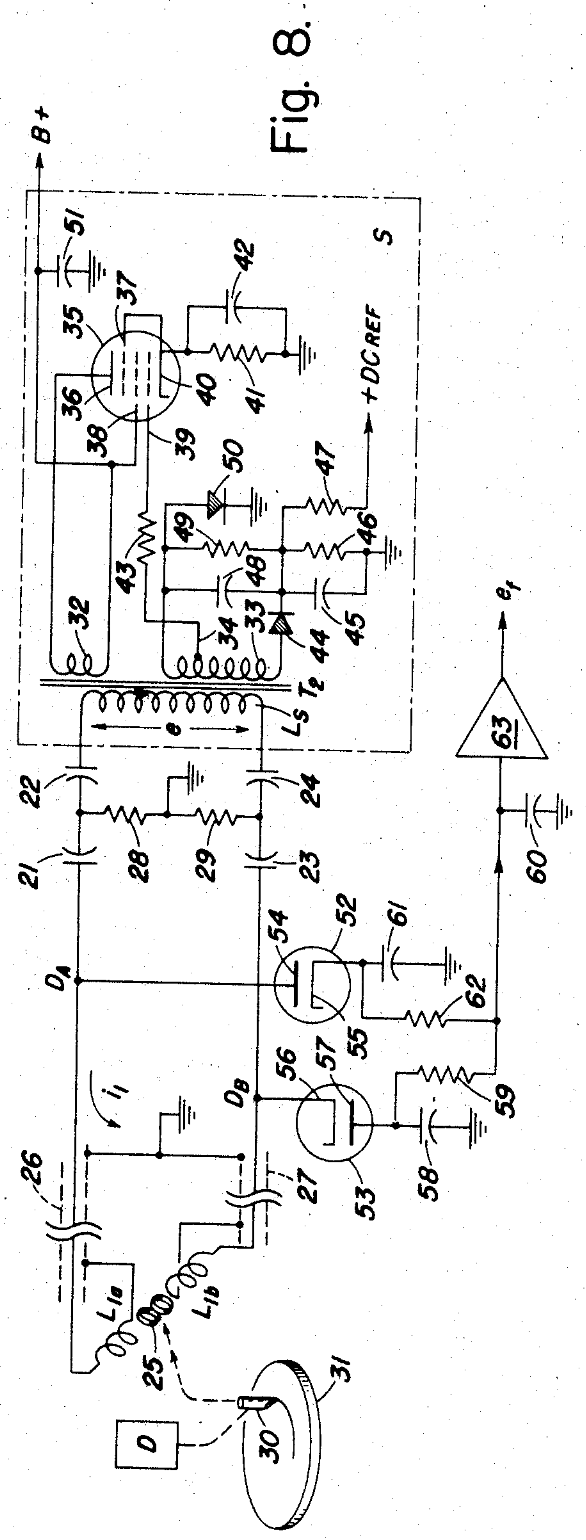
FIG. 8 is a schematic embodiment of the principles of the invention employed in a recording pick-up.

The features of the invention described above have been successfully employed in certain specific transducer applications including one associated with the cutting of records. Such an application is illustrated in FIGURE 8, the circuit of which is employed in the feedback path of a record cutting system. The function of the circuit is to sense displacement of a stylus 30 while it is cutting a record 31, and to develop a pair of voltages related to the displacement of the stylus. These voltages are differentially detected and fed back to the forward transmission section of the cutter circuits to promote high fidelity reproduction of the audio input in the record grooves.

Considering first the pick-up section, it is noted that a pair of inductors, $L_{1a}$ and $L_{1b}$ are physically associated with a pair of short-circuited or eddy-current rings 25. These rings are disposed axially on the armature to which the stylus 30 is connected. The armature is electro-magnetically controlled from a driver D which receives the data to be recorded. The rings 25 do not significantly load the driver with mass, a ring weighing ½ milligram having been employed in one installation. The coils $L_{1A}$ and $L_{1B}$ may also be of small size and few turns, e.g. 6 turns on a $\frac{1}{16}$ inch diameter polyiron core ($w_o$=27 mcs.).

As stylus 30 is displaced by driver D it causes the displacement of rings 25 which thereby vary the inductances of the coils $L_{1A}$ and $L_{1B}$ in push-pull fashion. This arrangement serves to cancel out distortion which would otherwise exist if a single coil and eddy current element were employed. Such a differential technique may also be employed in the other circuits disclosed herein. It is to be understood of course that the distortion mentioned here relates to the relationship between the input displacement and the inductance of the sensing coil, and not to the remainder of the circuit.

The coils $L_{1A}$ and $L_{1B}$ are integrated via coaxial cables 26, 27, in a tuned circuit which includes capacitors 21 to 24 and the secondary $L_s$ of the transformer $T_2$. It is therefore generally comparable to the topology of all the previously described circuits and is also oscillatory and has a high Q characteristic. In addition it possesses what is believed to be a novel AVC system associated with control of the oscillator.

The aforementioned coaxial cables 26, 27 permit remote coupling of coils $L_{1A}$ and $L_{1B}$ to the remainder of the tuned circuit and have been found to substantially eliminate the problem of Q reduction and sensitivity loss generally accompanying remote coupling. The shields of cables 26 and 27 are grounded and also provide return connections for the pick-ups. This arrangement also serves to mitigate certain problems associated with RF disturbances in the input circuit. Resistors 28 and 29 in the tuned circuit have a related function in that they are employed to dampen spurious oscillation. The resistors are connected to the circuit at a voltage node.

The tuned circuit is supplied with a voltage, $e$, developed across secondary $L_s$ of transformer $T_2$ and resulting from driving current flowing in primary winding 32. This current issues from plate 36 of the pentode to which one side of winding 32 is connected. The other side is connected to the screen 38 and to the supply B+. Decoupling condenser 51 is also connected to this point.

The suppressor 37 of the pentode is returned to cathode 40 and the latter is tied to ground via resistor 41 and bypass 42.

Transformer $T_2$ also includes a winding 33, a tap 34 of which is connected via parasitic suppressor 43 to grid 39 of the pentode. Besides assisting the feedback function, winding 33 is employed to control oscillation amplitude. It has the virtue of being responsive to both the frequency and amplitude of the current $i_1$ flowing in the output loop since the voltage induced in the winding is dependent upon these factors. The induced voltage in winding 33 may accordingly be used to hold the factor $wi_1$ constant. To this end, an AVC system is provided.

It is believed that the AVC system per se is novel. It has a simple time constant and excellent sensitivity. (It differs, however, from the circuit arrangements of copending application Ser. No. 712,423.) The AVC system is designed to hold the factor $wi_1$ constant by maintaining constant the voltage induced in winding 33. Thus there is connected in series with the winding a rectifier 44 and across this combination an RC circuit comprising capacitor 48 and resistor 49. The constant-polarity voltage developed across the RC network has an amplitude which is indicative of the voltage induced in winding 33. To this voltage is added a fixed amplitude bucking voltage obtained from a resistance divider 46, 47 energized by the voltage reference source "+ DC ref." The net voltage thus obtained is used to automatically adjust the grid-cathode bias of the pentode such that the factor $wi_1$ tends to remain constant. (There is no grid current, the oscillator being operated class A.)

In order to provide an RF return for the grid, capacitor 45 is employed. It is connected to the circuit at the cathode of rectifier 44 and to ground. A rectifier 50 is also included being connected to ground and to the top terminal of winding 33 to facilitate the start of oscillation.

It is evident that this circuit enjoys a simple time constant feature. It also has high sensitivity; the voltage induced in winding 33 may be large compared with the actual required grid bias since this voltage is opposed by the comparable voltage obtained from the reference source. It is the difference-voltage which provides dynamic bias control. (Of course the bias is also influenced to some extent by the small voltage drop developed across the cathode circuit 41, 42.)

With the pick-ups $L_{1A}$, $L_{1B}$ energized by the circuit described above a voltage is developed across each which is linear with respect to its associated pick-up, and, because of the push-pull eddy-current ring arrangement, is also linear with respect to displacement of the element 25. The two voltages are differentially detected by rectifiers 53 and 52 and associated decoupling networks 58, 59 and 61, 62. The net voltage is applied to amplifier 63 which develops a related voltage $e_f$, used as the feedback signal. A decoupling condenser 60 is also connected at the input of amplifier 63.

This differential detector or a single-ended one may also be employed in connection with the other circuits disclosed. In addition, the output, instead of being summed as is done in FIGURE 8, may be taken across the individual detector outputs.

In addition to being employed in disc cutting systems, the circuit of FIGURE 8 may be very usefully exploited in a phonograph pick-up for reproducing the recorded data. It is also particularly adapted to stereophonic cutting and reproducing systems; because of the multi-transduction capability, the additional pick-ups can be integrated directly into the FIGURE 8 tuned circuit. A second channel may also be independently added.

No matter what application is selected, the circuit of FIGURE 8 will be found to develop extraordinary linearity, excellent sensitivity, a high-level output and high signal noise ratio. No critical tuning or balancing is required and it, as well as the other circuits disclosed herein, does not depend on the frequency stability of the oscillator.

Figure 9:
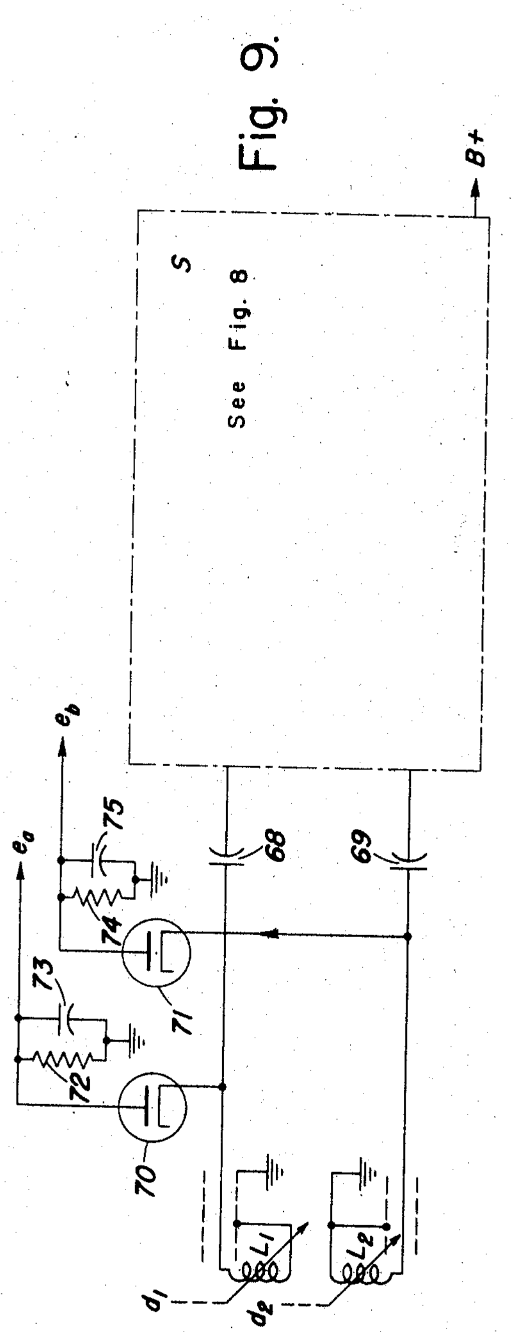
FIG. 9 is a circuit similar to FIG. 8 which is used for multiple transduction.

An illustration of the capability of FIGURE 8 to provide multiple transduction is found in FIGURE 9 which employs an oscillator circuit, S, similar to its counterpart in FIGURE 8. The tuned circuit is also generally similar except that the pick-ups $L_1$, $L_2$ are actuated from isolated data sources $d_1$, $d_2$. Series capacitive reactance is supplied by condensers 68, 69.

The individual outputs obtained from the pick-ups are separately detected by rectifiers 70, 71 and filter networks 72, 73 and 74, 75. Output voltage $e_a$ is responsive to $d_1$ and $L_1$; output $e_b$ is responsive to $d_2$ and $L_2$. Each voltage is used in accordance with the requirements of the intended application. For example, $d_1$ may represent cabin pressure in an aircraft while $d_2$ represents ambient pressure. Indicators energized by $e_a$ and $e_b$ would display these conditions.

All of the circuits disclosed herein have the inherent capability of measuring with great accuracy, the values of unknown inductance and capacitance. For example, the value of $e_1$ in FIGURES 4, 6 is a direct measure of the inductive value of $L_1$. The same is true for $C_1$ in FIGURE 5. Moreover, a plurality of elements can be measured simultaneously, e.g., $C_a$ and $C_b$ in FIGURE 7 and $L_1$ and $L_2$ in FIGURE 9. The measured values may be displayed on a properly calibrated meter responsive to $e_1$ or may be obtained by comparison with a standard ($C_a$, FIG. 7; $L_{1A}$, FIG. 8; $L_1$, FIG. 9) and the use of a null meter responsive to $e_f$ in FIGURE 8 or to $|e_a|-|e_b|$ in FIGURES 7, 9 (common terminal being the reference).

In constructing circuits embodying the principles of the invention it should be noted that modern components such as magnetic and solid-state devices may be effectively employed and the networks varied according to the laws of transformation and duality.

What is claimed is:

1. A transducing system comprising means for converting a variable quantity to a linearly related electrical parameter said converter means comprising a network including a variable reactance responsive to said variable quantity and further comprising an energizing circuit operatively coupled to said network for forming an oscillatory circuit, the frequency of which varies with changes in said variable reactance, said energizing circuit being connected to supply current to said variable reactance which varies with changes in said variable reactance, said energizing circuit including means for developing a signal whose amplitude is indicative of the relationship between the frequency and amplitude of said current, and control means for maintaining the amplitude of said signal constant to thereby maintain said frequency-amplitude relationship constant notwithstanding changes in said frequency and in said current amplitude for causing said electrical parameter to be linearly related to said variable reactance.

2. A system according to claim 1 in which said signal developing means comprises an element having the same reactive sign as said variable reactance.

3. A system according to claim 1 in which said signal is proportional to the product of said frequency and said amplitude whereby said product is maintained constant.

4. A system according to claim 1 in which said signal is proportional to the quotient of said frequency and said amplitude whereby said quotient is maintained constant.

5. A system according to claim 1 in which said network comprises a frequency determining part of said oscillatory circuit.

6. A system according to claim 1 including a reactive element connected to said network and in which said signal comprises the voltage across a reactive element having a reactive sign identical to the reactive sign of said variable reactance.

7. A system according to claim 1 in which an impedance serially connected to said variable reactance is included in said circuit.

8. A system according to claim 1 in which said variable reactance comprises a plurality of variable reactive elements.

9. A system according to claim 1 in which a voltage is developed across said variable reactance, which voltage constitutes said electrical parameter.

10. Apparatus according to claim 1 in which said network comprises a series circuit having reactance which is the conjugate of said variable reactance, and said signal developing means include a reactance connected across said series circuit and having the same reactive sign as said variable reactance.

11. Apparatus according to claim 1 in which said control means includes automatic amplitude control means.

12. Apparatus according to claim 1 including a detector circuit connected to be responsive to said electrical output quantity.

13. A transducing system as defined in claim 8 in which said variable reactive elements comprise a pair of coils and an electrically conductive element responsive to said variable quantity, said coils being jointly responsive to and oppositely disposed from said electrically conductive element and being arranged such that their inductances are varied by said conductive element.

14. A transducing system as defined in claim 1 including cutting stylus means coupled to said variable reactance for varying same.

References Cited

UNITED STATES PATENTS

| | | | |
|---|---|---|---|
| 2,394,018 | 2/1946 | Shank et al. | 331—176 |
| 2,742,609 | 4/1956 | Black et al. | 324—61 |
| 2,790,145 | 4/1957 | Bartelink | 331—65 XR |
| 2,807,720 | 9/1957 | Charles | 324—61 XR |
| 2,902,645 | 9/1959 | Wallenfang | 324—59 |
| 2,906,948 | 9/1959 | Shawhan | 324—61 XR |
| 2,931,900 | 4/1960 | Goodman | 324—58 |

RUDOLPH V. ROLINEC, *Primary Examiner.*

E. E. KUBASIEWICZ, *Assistant Examiner.*

U.S. Cl. X.R.

307—111; 331—183; 340—195